(12) United States Patent
Pannicke

(10) Patent No.: US 11,889,383 B2
(45) Date of Patent: Jan. 30, 2024

(54) PRODUCT PALLET AND METHOD FOR ESTABLISHING THE POSITION OF A PRODUCT PALLET

(71) Applicant: CHEP Technology Pty Limited, Sydney (AU)

(72) Inventor: Marco Pannicke, Cologne (DE)

(73) Assignee: CHEP TECHNOLOGY PTY LIMITED, Sydney (AU)

( * ) Notice: Subject to any disclaimer, the term of this patent is extended or adjusted under 35 U.S.C. 154(b) by 530 days.

(21) Appl. No.: 17/266,274

(22) PCT Filed: Aug. 8, 2019

(86) PCT No.: PCT/EP2019/071337
§ 371 (c)(1),
(2) Date: Feb. 5, 2021

(87) PCT Pub. No.: WO2020/030747
PCT Pub. Date: Feb. 13, 2020

(65) Prior Publication Data
US 2021/0306810 A1 Sep. 30, 2021

(30) Foreign Application Priority Data
Aug. 8, 2018 (DE) ...................... 10 2018 119 341.6

(51) Int. Cl.
*H04W 4/02* (2018.01)
*H04W 64/00* (2009.01)
(Continued)

(52) U.S. Cl.
CPC ............. *H04W 4/029* (2018.02); *G16Y 10/45* (2020.01); *G16Y 20/40* (2020.01); *H04W 4/80* (2018.02)

(58) Field of Classification Search
CPC ........ H04W 4/029; H04W 4/80; G16Y 20/40; G16Y 20/45
See application file for complete search history.

(56) References Cited

U.S. PATENT DOCUMENTS

2009/0101712 A1   4/2009   Ulrich et al.
2011/0227725 A1   9/2011   Muirhead
(Continued)

FOREIGN PATENT DOCUMENTS

CN   112801755 A     5/2021
EP      3301890       4/2018
JP   2010-537347 A   12/2010

OTHER PUBLICATIONS

Karin Wunderlich "The CHEP range learns to speak—ECR Award winner 2016!" https://zukunftdeseinkaufens.de/die-palette-lernt-sprechen-ecr-award-gewinner-2016! pp. 4.
(Continued)

*Primary Examiner* — Moustapha Diaby
(74) *Attorney, Agent, or Firm* — Alston & Bird LLP

(57) ABSTRACT

The invention relates to a product pallet (10) comprising an autonomous module (20), which has a smartphone-seeking module (24), by which the presence of smartphones in the vicinity of the product pallet (10) can be detected, and a transmission module (22), by which data can be transferred over a data network. The invention also relates to a method for establishing the position of a product pallet (10) in a shop, wherein, in a first step, a module (20) provided on a product pallet (10) detects which smartphones are located in the vicinity of the product pallet (10), and, in a second step, a decision is made in an automated manner as to whether the product pallet (10) is located on a shop floor of a shop or in the shop stockroom depending on the number of detected smartphones.

20 Claims, 1 Drawing Sheet

Figure 1:
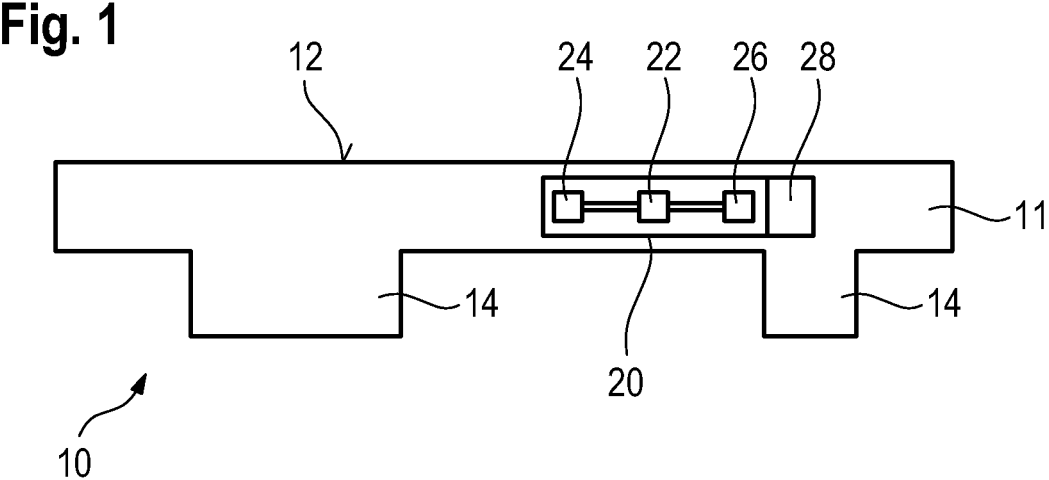

(51) Int. Cl.
*H04W 4/029* (2018.01)
*H04W 4/80* (2018.01)
*G16Y 20/40* (2020.01)
*G16Y 10/45* (2020.01)

(56) References Cited

U.S. PATENT DOCUMENTS

| | | | |
|---|---|---|---|
| 2012/0252501 A1* | 10/2012 | Smith | H04W 4/38 |
| | | | 455/456.5 |
| 2013/0324152 A1 | 12/2013 | Lee et al. | |
| 2017/0323412 A1* | 11/2017 | Muirhead | G06K 19/0723 |
| 2019/0057231 A1* | 2/2019 | Bandil | G08C 17/02 |
| 2019/0130345 A1* | 5/2019 | Antor | G06Q 10/0833 |
| 2019/0235092 A1* | 8/2019 | Bastian, II et al. | G01G 19/52 |
| 2020/0019927 A1* | 1/2020 | Muirhead | H04W 4/35 |
| 2021/0073724 A1* | 3/2021 | Souder | G06F 16/9537 |

OTHER PUBLICATIONS

Tom Lukaß "Offline tracking: customer frequency measurement in shops" https://www.datenschutz-notizen.de/offline-tracking-kundenfrequenzmessung-in-ladengeschaeften-4515135/ Jul. 5, 2016 ; pp. 3.

Von Detlev Flach "IoT—Connectivity is what counts" https://www.computerwoche.de/a/iot-auf-die-connectiviety-kommt-es-an,3544244; Feb. 12, 2018; pp. 5.

International Search Report and Written Opinon for International Application No. PCT/EP2019/071337, dated Oct. 18, 2019, (12 pages), European Patent Office, Rijswijk, Netherlands.

Office Action for Japanese Patent Application No. 2021-531185, dated Aug. 22, 2023, (4 pages), Japan Patent Office, Tokyo, Japan.

Communication Pursuant to Article 94(3) EPC for European Patent Application No. 19753030.6, dated Aug. 28, 2023, (4 pages), European Patent Office, Rijswijk, Netherlands.

* cited by examiner

PRODUCT PALLET AND METHOD FOR ESTABLISHING THE POSITION OF A PRODUCT PALLET

The invention relates to a product pallet and to a method for establishing the position of a product pallet, in particular of a product pallet used as a secondary placement for products and of a product pallet used for replenishment.

Secondary placement is understood to mean that products are offered to customers not only on shelf space but also at a second point of sale in the shop, in particular on a product pallet on which a display specific to the product can be arranged to attract greater attention.

The number of these secondary placements is constantly increasing in the German food retail industry. A distinction is generally drawn between two types of secondary placement. One is focused on weekly promotions, e.g. from a flyer. The other is a permanent secondary placement. In the first type in particular, timely placement on the shop floor is extremely important since the weekly promotions are advertised in television adverts or using coupon campaigns or flyers. The product supplier is thus making a certain financial outlay to boost sales of their product by way of marketing and market development funds. However, the supplier is unable to verify whether the product being promoted has been moved out of the stockroom and placed on the shop floor at the correct time.

The object of the invention is to allow suppliers to verify, in an automated manner, whether the product they are promoting is offered to customers on the shop floor in the shop as agreed.

To achieve this object, according to the invention a product pallet equipped with an autonomous module is provided, which module has a smartphone-seeking module, by which the presence of smartphones in the vicinity of the product pallet can be detected, and a transmission module, by which data can be transferred over a data network.

In this case, an "autonomous module" is understood to be an electronic assembly that functions without an external power supply. It may be a tag that contains a battery, i.e. that can actively transmit, or a beacon that responds to an external signal.

To achieve this object, a method is also provided according to the invention, in which, in a first step, a module provided on a product pallet interacts with smartphones located in the vicinity of the product pallet, and, in a second step, a decision is made in an automated manner as to whether the product pallet is located on a shop floor of a shop or in the shop stockroom depending on the number of different smartphones with which there was interaction.

Both the product pallet according to the invention and the method according to the invention are based on the finding that the number of different smartphones that "pass by" in the vicinity of a product pallet within a predefined time allows for a highly accurate conclusion as to whether the product pallet is located in the stockroom or on a shop floor. If there are no smartphones, only a few smartphones or always the same smartphones, the product pallet is located in the stockroom. If there are many different smartphones, the product pallet is located on the shop floor.

According to a variant, the interaction with the smartphones can be carried out by the modules explained in relation to the product pallet according to the invention, said modules being equipped with a smartphone-seeking module and a transmission module. These modules can particularly effectively detect the smartphones in the area surrounding the product pallets by means of the WLAN modules of said smartphones, in particular on the basis of the MAC address of the WLAN modules of the smartphones.

The information detected by the module is transmitted over a data link that is distinguished on account of low energy consumption. For this purpose, a GSM, e.g. a 2G link and/or an NB-IoT link (narrowband Internet of Things link), can be used in particular.

The module is equipped with a battery, which supplies said module with electrical energy. Since all the functions have low energy consumption, the battery is able to supply the module with electrical energy for a period of up to 10 years.

According to a configuration of the invention, the module has a movement sensor. Said sensor makes it possible to detect the smartphones on a situational basis, e.g. after the product pallet has been moved. This can save energy and accordingly increase the service life of the module. If a position of the product pallet within the shop is established once to a sufficiently high degree of certainty on the basis of the detected smartphones, it can be assumed that the position does not change unless the product pallet is moved. Only when it is detected that the product pallet has been moved is a new detection operation initiated; this operation can be terminated when the position of the product pallet within the shop is re-established to a sufficiently high degree of accuracy.

By means of the transmission module, "raw information" on the detected smartphones can be transmitted (e.g. the different smartphones detected in a particular unit of time or a characteristic number calculated in a predefined manner). Preferably, however, information on the position of the product pallet in the shop is actually transmitted (e.g. the information "shop floor" when a relatively large number of different smartphones has been detected within a predefined period of time, or "no shop floor" when the number of different smartphones detected within the predefined time period was below a predefined threshold).

Preferably, measurements are taken at set times, e.g. in the mornings at 9.00 and in the evenings at 18.00. The "thresholds" for distinguishing between different positions can be set depending on the expected customer flows and also the size of the stockroom (and thus the number of non-customer smartphones expected therein). By way of example, expedient numbers may be more than 10 different smartphones every 5 minutes.

According to an alternative variant, the modules used for the method according to the invention are beacons, i.e. tags, which, when the Bluetooth function of a smartphone is activated, can interact with an app installed on said smartphone, e.g. with the app of the food retail chain in whose shop the customer is currently located. If the app interacts with a beacon of this kind, the app can send a message to a server stating that said interaction took place. If a plurality of such messages are received within a short time regarding the same product pallet, it can be concluded that the product pallet in question is located on a shop floor.

Figure 2:
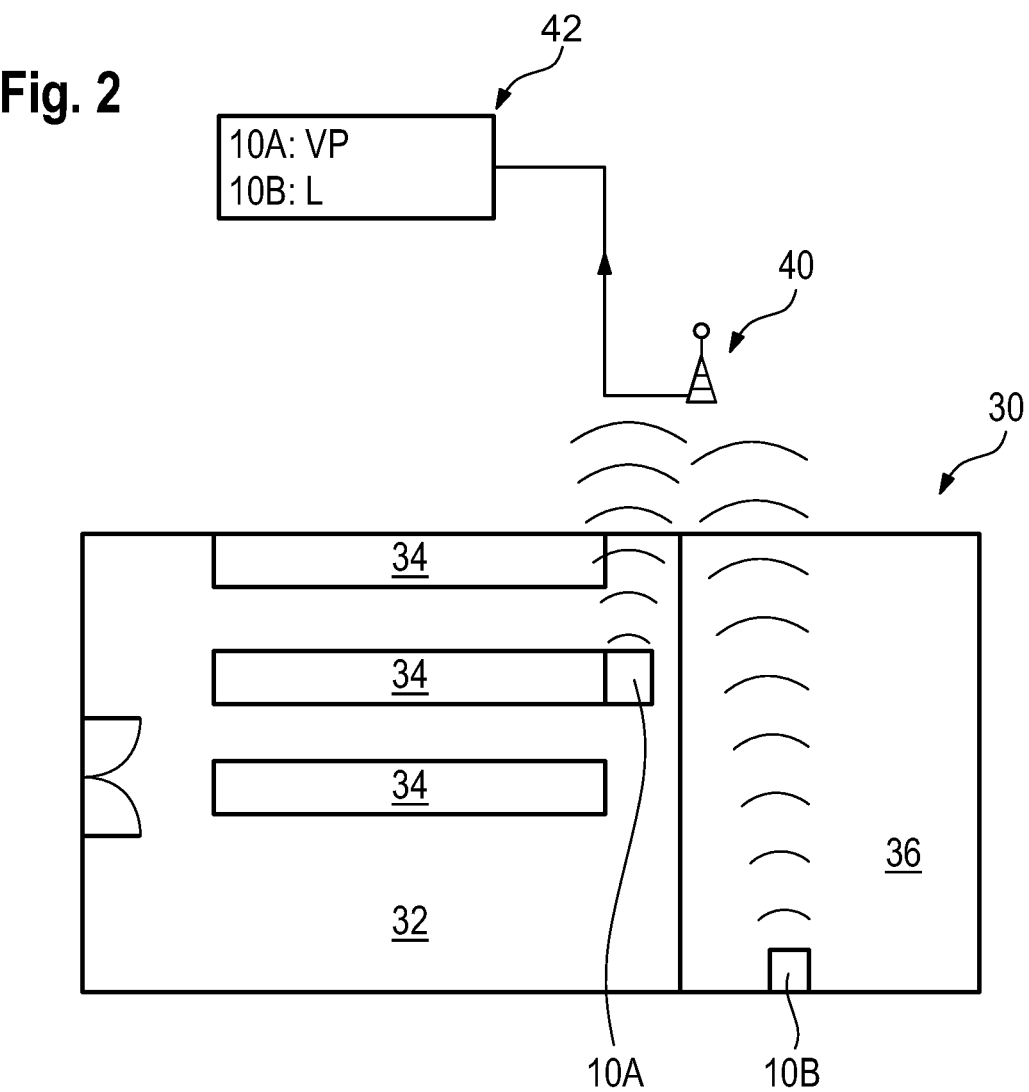

The invention will be described below on the basis of an embodiment shown in the accompanying drawings, in which:

FIG. 1 is a schematic view of a product pallet according to the invention; and FIG. 2 is a schematic view of two product pallets according to the invention that are positioned in different locations within a shop and the positions of which within the shop are established by means of the method according to the invention.

FIG. 1 is a schematic view of a product pallet 10 that has a product support plate 11 having a substantially planar top surface 12 on which products can be accommodated. A plurality of feet 14 are provided on the underside of the product support plate 11.

The product pallet 10 is loaded with products in a distribution centre and then transported to a shop (e.g. a supermarket). The products are arranged on the product pallet in such a way that the product pallet 10 can be set down directly on a shop floor; therefore, the products need not be additionally placed on a shelf. For this purpose, a display (e.g. a printed paper board) presenting the products in a promotional manner can be attached to the product pallet 10.

The product pallet 10 is equipped with a module 20 that contains a transmission module 22, a smartphone-seeking module 24 and a movement sensor 26. A battery is also integrated.

The module 20 is preferably a unit sealed in a water-tight manner that is fastened, for example, to the underside of the product support plate 11 or, if said plate has a honeycomb structure, is attached in one of the cavities of the honeycomb structure in a countersunk manner such as to not protrude beyond the underside of the product support plate 11.

The smartphone-seeking module 24 "scans" the surrounding area and determines how many different smartphones there are in its surrounding area. For this purpose, the MAC addresses of the WLAN modules of the smartphones are detected in particular. In the process, the detected MAC addresses are compared with the already-discovered MAC addresses to ensure that the same smartphone (e.g. of a stockroom worker) is not counted multiple times.

The transmission module 22 transmits information on the number of different detected smartphones over a data link that has a low bandwidth and also low energy consumption. Examples are 2G and NB-IoT.

The movement sensor 26 detects whether the product pallet 10 is moved. This information is used in particular to activate the smartphone-seeking module 24.

The product pallet shown may, in particular, be what is known as a quarter pallet. However, the product pallet can also be a pallet used for replenishment. In this case, the pallets are ½ or Euro pallets for sugar, flour, water, kitchen roll, etc.

The functioning of the product pallet 10 and the evaluation of the detected data will be explained on the basis of FIG. 2.

FIG. 2 schematically shows a shop 30 (e.g. a supermarket) that has a shop floor 32 comprising shelves 34 and a stockroom 36.

One product pallet 10A is positioned on the shop floor 32, and an additional product pallet 10B is located in the stockroom 36.

At regular intervals or following the materialisation of certain factors (e.g. the product pallet has been moved), the smartphone-seeking module 24 of the two product pallets 10A, 10B searches for the MAC addresses of the smartphones located in the surrounding area. Once the MAC addresses have been "found", the system automatically compares whether
1) MAC addresses have indeed been found
2) there was a significant change in MAC addresses compared with the previous scanning operation
3) the MAC addresses are the same.
In case 1), it can be assumed that the product pallet 10 is not located on a shop floor 32, but rather is in the stockroom 36.
In case 2), it can be assumed that the product pallet 10 is located on a shop floor 32.
In case 3), it can again be assumed that the product pallet 10 is located in the stockroom 36 and only the staff smartphones are detected.

The transmission module 22 of the modules 20 transfers the information on the different detected smartphones via 2G, NB-IoT or similar telecommunications technology (see the schematically illustrated receiver station 40) such that a suitable application, database or computer program can show (reference numeral 42) where the product pallet 10 in question is located: for the product pallet 10A, it has been determined that it is located on a shop floor VP on the basis of a high number of different smartphones detected within a particular time period, whilst for the product pallet 10B it has been determined that it is located in the stockroom L on the basis of a low number of different smartphones.

This information allows the retailer and the supplier of the product pallets 10 to see whether
the product has been placed on a shop floor 32 at the correct time (set-up of an alert system),
enough stock has been ordered, since it is now possible to reliably track whether the product was available from the outset and when the product pallet was withdrawn,
stock needs reordering, since it can be seen in real time whether the product pallet has been placed back in the stockroom 36 even though the promotion may still be running for a few more days.

The invention claimed is:

1. A product pallet comprising:
a product support plate having a planar top surface for receiving products thereon;
a plurality of feet provided on an underside of said product support surface; and
an autonomous device carried by said product support plate and comprising:
a smartphone-seeking module configured to detect presence of smartphones in a vicinity of the product pallet, and
a transmission module coupled to said smartphone-seeking module and configured to transmit data over a data network in response to detecting the presence of smartphones in the vicinity of the product pallet, with the detected smartphones being used to determine a location of the product pallet.

2. The product pallet according to claim 1, wherein said smartphone-seeking module is configured to periodically scan for a unique identifier assigned to each respective smartphone detected in the vicinity of the product pallet.

3. The product pallet according to claim 2, wherein the unique identifier comprises a media access control (MAC) address.

4. The product pallet according to claim 2, wherein the data transmitted by said transmission module comprises the detected unique identifiers, with the detected unique identifiers being compared with already discovered unique identifiers to determine that one of the detected smartphones is not being counted twice.

5. The product pallet according to claim 4, wherein a number of the detected smartphones is compared to a threshold to determine if the product pallet is at a first location or at a second location, with the first location corresponding to the number of the detected smartphones being less than the threshold, and with the second location corresponding to the number of the detected smartphones being greater than the threshold.

6. The product pallet according to claim 1, wherein said autonomous device further comprises a movement sensor configured to detect movement of the product pallet, with said smartphone-seeking module being activated in response to said movement sensor detecting movement of the product pallet.

7. The product pallet according to claim 1, wherein the data network is configured as a low energy consumption wireless local area network (WLAN).

8. The product pallet according to claim 1, wherein said autonomous device further comprises a battery coupled to said smartphone-seeking module and said transmission module.

9. The product pallet according to claim 1, wherein said autonomous device is attached to the underside of said product support surface.

10. The product pallet according to claim 1, wherein said product support surface includes at least one cavity therein to receive said autonomous device.

11. The product pallet according to claim 1, wherein autonomous device interfaces with a database over the data network.

12. The method according to claim 2, wherein the data transmitted by the autonomous device comprises the detected unique identifiers, with the detected unique identifiers being compared with already discovered unique identifiers to determine that one of the detected smartphones is not being counted twice.

13. The method according to claim 12, wherein a number of the detected smartphones is compared to a threshold to determine if the product pallet is at a first location or at a second location, with the first location corresponding to the number of the detected smartphones being less than the threshold, and with the second location corresponding to the number of the detected smartphones being greater than the threshold.

14. A method for establishing location of a product pallet comprising a product support plate having a planar top surface for receiving products thereon, a plurality of feet provided on an underside of the product support surface, and an autonomous device carried by the product support plate, the method comprising:
operating the autonomous device to perform the following:
detect presence of smartphones in a vicinity of the product pallet, and
transmit data over a data network in response to detecting the presence of smartphones in the vicinity of the product pallet, with the detected smartphones being used to determine the location of the product pallet.

15. The method according to claim 14, wherein said autonomous device is configured to periodically scan for a unique identifier assigned to each respective smartphone detected in the vicinity of the product pallet.

16. The method according to claim 15, wherein the unique identifier comprises a media access control (MAC) address.

17. The method according to claim 14, wherein the autonomous device is further configured to detect movement of the product pallet, with detected movement being used to initiate detecting the presence of smartphones in the vicinity of the product pallet.

18. The method according to claim 14, wherein the data network is configured as a low energy consumption wireless local area network (WLAN).

19. The method according to claim 14, wherein the autonomous device is powered by a battery.

20. The method according to claim 14, wherein the autonomous device interfaces with a database over the data network.

* * * * *